United States Patent
Neubrand

(10) Patent No.: US 7,866,726 B2
(45) Date of Patent: Jan. 11, 2011

(54) CONVERTIBLE TOP HAVING MOVABLE OUTBOARD PANELS

(75) Inventor: Frank Neubrand, West Bloomfield, MI (US)

(73) Assignee: Wilhelm Karmann GmbH, Munich (DE)

( * ) Notice: Subject to any disclaimer, the term of this patent is extended or adjusted under 35 U.S.C. 154(b) by 226 days.

(21) Appl. No.: 11/963,187

(22) Filed: Dec. 21, 2007

(65) Prior Publication Data

US 2009/0160207 A1    Jun. 25, 2009

(51) Int. Cl.
B60J 7/047    (2006.01)
B60N 2/20    (2006.01)

(52) U.S. Cl. ............... 296/108; 296/107.17; 296/65.16

(58) Field of Classification Search ............ 296/107.01, 296/108, 107.08, 107.16, 107.17, 65.01, 296/65.09, 65.16, 65.17
See application file for complete search history.

(56) References Cited

U.S. PATENT DOCUMENTS

| | | | | |
|---|---|---|---|---|
| 5,647,630 | A | * | 7/1997 | Jambor et al. ............... 296/108 |
| 5,967,591 | A | * | 10/1999 | Muehlhausen ......... 296/107.16 |
| 6,131,988 | A | * | 10/2000 | Queveau et al. ........ 296/107.17 |
| 6,382,703 | B1 | * | 5/2002 | Queveau et al. ........ 296/107.17 |
| 6,419,295 | B1 | * | 7/2002 | Neubrand .............. 296/107.07 |
| 6,702,363 | B2 | * | 3/2004 | Tohda et al. ................. 296/124 |
| RE38,546 | E | * | 7/2004 | Corder et al. ............... 296/108 |
| 6,761,392 | B2 | * | 7/2004 | Hasselgruber et al. ...... 296/108 |
| 6,866,324 | B2 | * | 3/2005 | Neubrand et al. .......... 296/108 |
| 7,100,963 | B2 | * | 9/2006 | Queveau et al. ............ 296/108 |
| 7,255,385 | B2 | * | 8/2007 | Queveau et al. ............ 296/108 |
| 7,494,175 | B2 | * | 2/2009 | Condon et al. ............. 296/110 |
| 2003/0080580 | A1 | * | 5/2003 | Obendiek .............. 296/107.17 |
| 2003/0160475 | A1 | * | 8/2003 | Tohda et al. ................ 296/124 |
| 2003/0197393 | A1 | * | 10/2003 | Hanagan .................. 296/65.01 |
| 2004/0004369 | A1 | * | 1/2004 | Neubrand et al. .......... 296/108 |
| 2007/0187984 | A1 | * | 8/2007 | Brockhoff ................... 296/108 |
| 2008/0093880 | A1 | * | 4/2008 | Westermann et al. .. 296/107.17 |
| 2008/0265610 | A1 | * | 10/2008 | Condon et al. ......... 296/107.08 |
| 2009/0160207 | A1 | * | 6/2009 | Neubrand ................ 296/65.01 |

(Continued)

FOREIGN PATENT DOCUMENTS

DE    3903358    *    2/1989    ................. 296/108

(Continued)

*Primary Examiner*—Glenn Dayoan
*Assistant Examiner*—Gregory Blankenship
(74) *Attorney, Agent, or Firm*—Gifford, Krass, Sprinkle, Anderson & Citkowski, P.C.; Douglas L. Wathen

(57) ABSTRACT

A convertible top assembly for a motor vehicle includes a rear panel, a front panel and a pair of outer side panels. The front panel is movably coupled to the rear panel and movable relative to the rear panel between an extended position extending between the rear panel and a windshield header of the vehicle and a retracted position stacked with the rear panel. The outer side panels are movably coupled to the rear panel for movement between a use position extending outwardly from opposite sides of the rear panel and a stowed position disposed inwardly from the use position. The convertible top assembly further includes a linkage operatively connecting the front panel and outer side panels so as to cause movement of the outer side panels between the use position and the stowed position in response to movement of the front panel between the extended position and the retracted position, respectively.

32 Claims, 7 Drawing Sheets

U.S. PATENT DOCUMENTS

2009/0174218 A1 * 7/2009 Koch .................... 296/107.17

FOREIGN PATENT DOCUMENTS

| DE | 10121839 | A1 * | 11/2002 |
| DE | 102004021576 | * | 12/2005 |
| DE | 102004061776 | A1 | 7/2006 |
| EP | 1787843 | | 5/2007 |
| FR | 2882001 | A1 | 8/2006 |

* cited by examiner

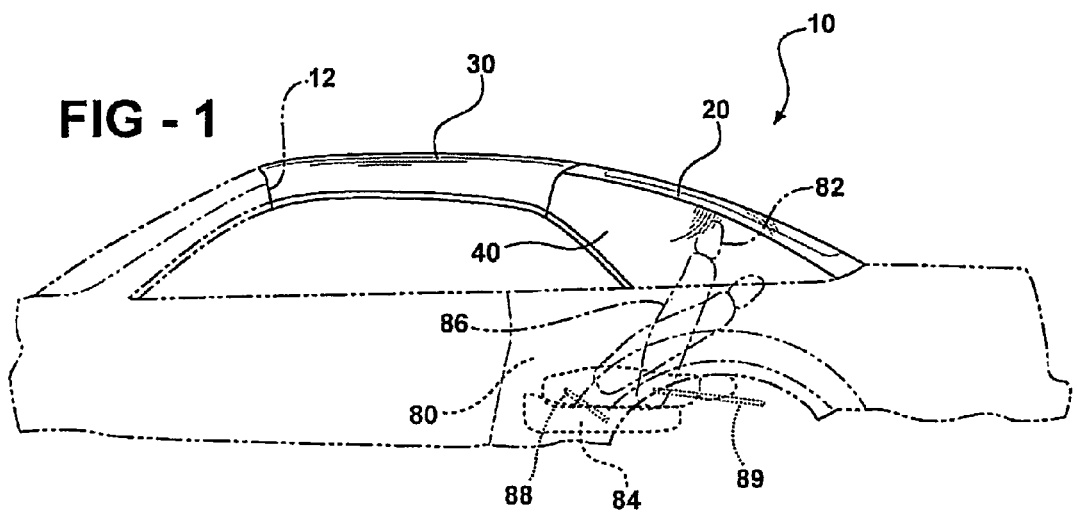
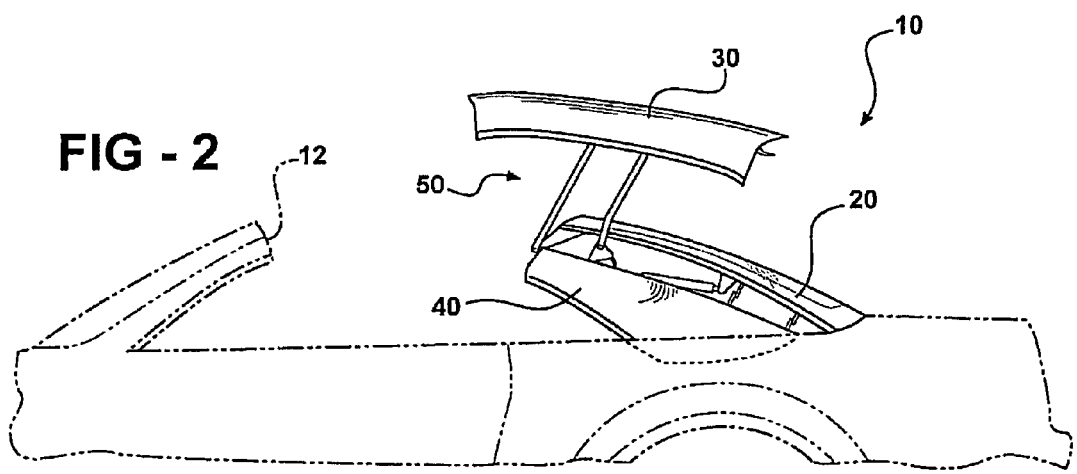
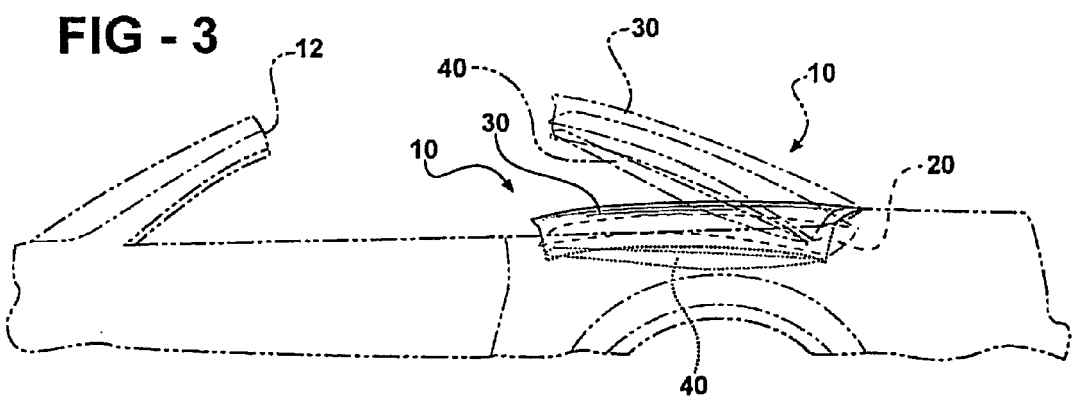

CONVERTIBLE TOP HAVING MOVABLE OUTBOARD PANELS

FIELD OF THE INVENTION

The invention relates to a convertible top assembly for a motor vehicle. More particularly, the invention relates to a convertible top assembly having outboard panels movable between use and stowed positions in response to movement of a front panel between extended and retracted positions.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moonroofs are some of the simplest designs and offer the opportunity to open a portion of the vehicle roof for increased airflow. More complicated designs allow the entire roof structure to be retracted and stored behind the passenger compartment.

Retractable roof systems generally fall into two categories. The most common type of retractable roof design is a convertible soft top or roof. These designs include an articulating structural framework with a flexible cloth or plastic outer skin. In an extended position, the front end of the articulating framework connects to a header above the vehicle windshield and the outer skin extends over the passenger compartment. When retracted, the articulating mechanism, along with the outer skin, folds into a compact shape. While convertible soft tops offer the choice between a covered or uncovered passenger compartment, they also suffer from several disadvantages in comparison to traditional rigid roof structures. Vehicles with soft tops are typically less well sealed against the elements and road noise. They are also less resistant to break-in attempts and have a less finished interior appearance.

The other retractable roof design is a retractable or folding hardtop roof system. Retractable hardtops consist of one or more rigid roof elements that are mechanically articulated such that they can be repositioned into a storage area behind the passenger compartment. Because the retractable hardtop consists of rigid sections, the system can provide a much closer approximation of a traditional rigid roof structure. In the extended position, a retractable hardtop securely covers and seals the passenger compartment, giving the appearance of a permanent roof. A retractable hardtop does a significantly better job of sealing the passenger compartment, reducing noise, and preventing break-ins. However, the retraction and storage of the hardtop presents significant mechanical challenges. Typically, when the retractable hardtop is in the stowed position, it resides in the portion of the vehicle traditionally provided for storage, such as the vehicle's trunk. While the storage space may be completely usable when the hardtop is in the extended position, most consumers prefer not to sacrifice the use of the storage position when the roof is retracted. There is generally a tradeoff between storage efficiency and mechanical complexity.

Thus, it remains desirable to provide an improved rigid or hard top convertible design that minimizes or eliminates the sacrifice in trunk space typically associated with conventional top designs.

SUMMARY OF THE INVENTION

According to one aspect of the invention, a convertible top assembly is provided for a motor vehicle. The convertible top assembly includes a rear panel, a front panel and a pair of outer side panels. The front panel is movably coupled to the rear panel and movable relative to the rear panel between an extended position extending between the rear panel and a windshield header of the vehicle and a retracted position stacked with the rear panel. The outer side panels are movably coupled to the rear panel for movement between a use position extending outwardly from opposite sides of the rear panel and a stowed position disposed inwardly from the use position. The convertible top assembly further includes an articulating mechanism operatively connecting the front panel and outer side panels so as to cause movement of the outer side panels between the use position and the stowed position in response to movement of the front panel between the extended position and the retracted position, respectively.

According to another aspect of the invention, a motor vehicle includes a convertible top movable between a closed position extending over a passenger compartment in the vehicle and an open position in which a substantial portion of the top is disposed in the passenger compartment in the vehicle. The motor vehicle also includes a rear seat having a seat cushion for supporting a seated occupant and a seat back for supporting the back of the seated occupant. The seat back is movable between an upright use position and a folded flat position overlying the seat cushion so as to accommodate the movement of the convertible between the closed and open positions.

BRIEF DESCRIPTION OF THE DRAWINGS

Advantages of the present invention will be readily appreciated as the same becomes better understood by reference to the following detailed description when considered in connection with the accompanying drawings, wherein:

FIG. 1 is a side elevational view of a motor vehicle according to one embodiment of the invention with a convertible top shown in an extended or closed position;

FIG. 2 is a side elevational view of the motor vehicle with the convertible top in a partially open position;

FIG. 3 is a side elevational view of the motor vehicle with the convertible top in the fully open or retracted position;

DETAILED DESCRIPTION OF THE INVENTION

Figure 4:
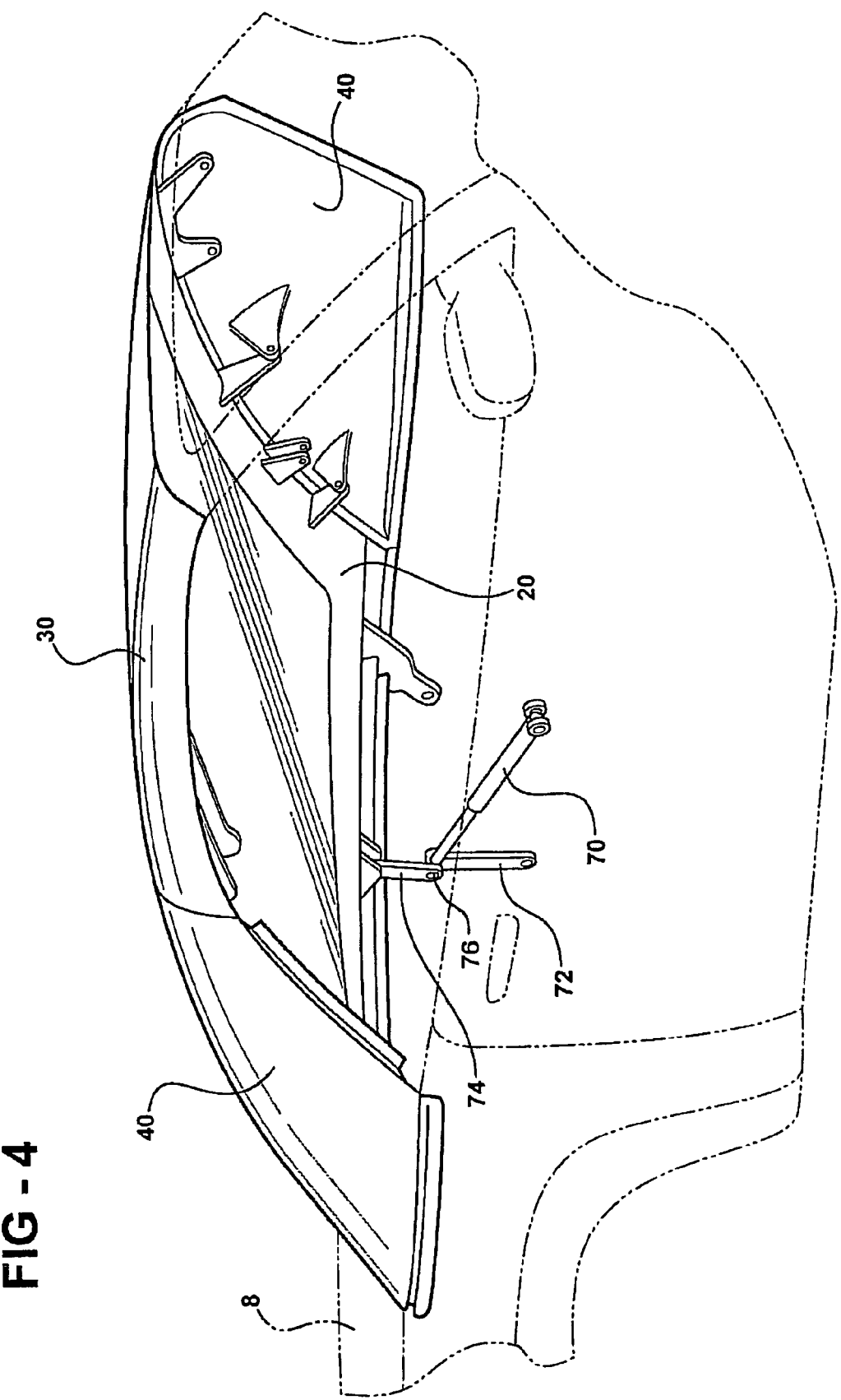
FIG. 4 is a perspective view of the convertible top in the extended position.
Figure 5:
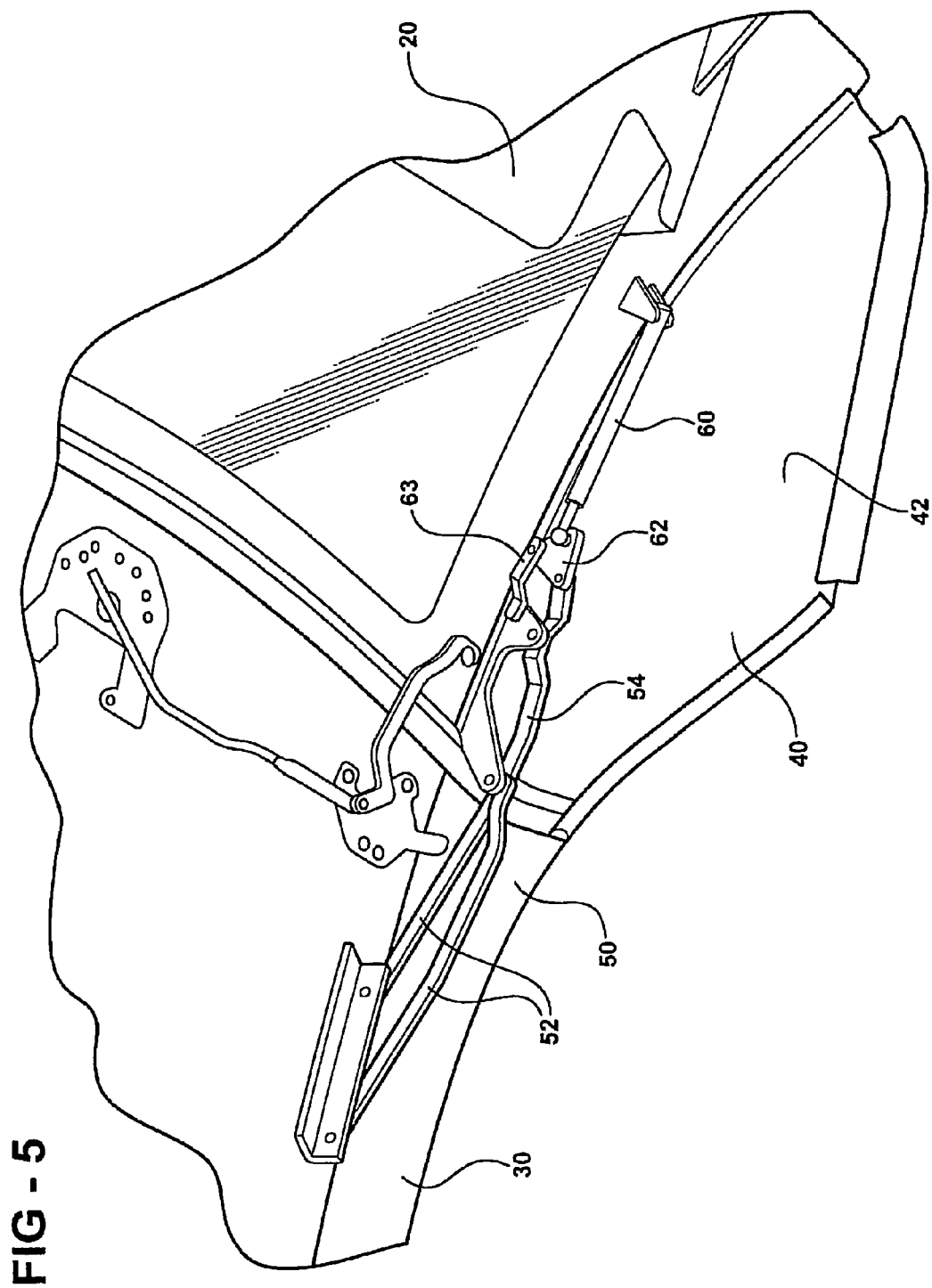
FIG. 5 is a bottom perspective view of a portion of the convertible top in the extended position.

Referring to the figures, a convertible top assembly for a motor vehicle is generally indicated at 10. The convertible top assembly 10 includes a rear panel 20, a front panel 30 and a pair of outer side panels 40. The front panel 30, as shown, is substantially rigid. The front panel 30 may, however, be constructed as a frame with a flexible covering. The front panel 30 is movably coupled to the rear panel 20 and movable relative to the rear panel 20 between an extended position extending between the rear panel 20 and a windshield header 12 of the vehicle 10 and a retracted position extending over or stacked relative to the rear panel 20. The outer side panels 40 are movably coupled to the rear panel 20 for movement between a use position extending outwardly from opposite sides 22, 24 of the rear panel 20 and a stowed position disposed inwardly from the use position. In the illustrated embodiment, the side panels are stowed below the rear panel 20. Described in greater detail below, the convertible top assembly 10 further includes an articulating mechanism operatively connecting the rear panel 20, front panel 30 and outer side panels 40 so as to cause movement of the outer side panels 40 between the use position and the stowed position in response to movement of the front panel 30 between the extended position and the retracted position, respectively.

In FIGS. 2-9, the articulating mechanism is generally indicated at 50. Though only one side of the articulating mechanism 50 is shown and described below, it should be appreciated that the articulating mechanism 50 is generally symmetrically opposite about a longitudinal center line of the vehicle. The articulating mechanism 50 includes a four bar linkage 52 pivotally interconnecting the rear panel 20 and the front panel 30. The linkage 52 provides the movement of the front panel 30 relative to the rear panel 20 between the extended position and the retracted position. A portion of the articulating mechanism 50 moves through gaps defined between each side panel 40 and the rear panel 20 during movement of the front panel 30 between the extended and retracted positions.

One link of the four bar linkage 52 is a driving link 54 that is mechanically coupled to one of the outer side panels 40. In the illustrated embodiment, the driving link 54 is the rearmost link of the four bar linkage 52. A driven link 55 operatively connects the driving link 54 to the one of the outer side panels 40. More specifically, a first end 56 of the driven link 55 is coupled to the driving link 54 by a ball joint. A second end 58 of the driven link 55 is coupled to an inner surface 42 of the one of the outer side panels 40. More specifically, each of the first 56 and second 58 ends of the driven link 55 is pivotally coupled to the driving link 54 and the inner surface 42 of the one of the outer side panels 40, respectively, by a ball joint.

An actuator 60 is operatively coupled to a link of the four bar linkage 52 to cause movement of the front panel 30 between the extended and retracted positions. In one embodiment, the actuator 60 is a linear actuator mechanically coupled to the driving link 54. A rocker 62 is pivotally coupled to the rear panel 20 by a link 63 and to the driving link 54 of the four bar linkage 52. The actuator 60 is coupled to the rocker 62 and rotatably drives the rocker 62 to cause corresponding pivotal movement of the front panel 30 relative to the rear panel 20 between the extended and retracted positions.

Referring to FIG. 3, the rear panel 20 is pivotally coupled to a body of the motor vehicle for movement of the top assembly 10 while the front panel 30 is in the retracted position between a partially closed position, as indicated by the dotted lines in FIG. 3, wherein a substantial portion of the top assembly 10 is disposed above a beltline of the motor vehicle, and a fully closed position, as indicated by the solid lines in FIG. 3, wherein the top assembly 10 is disposed in a rear seat area of the vehicle.

Figure 6:
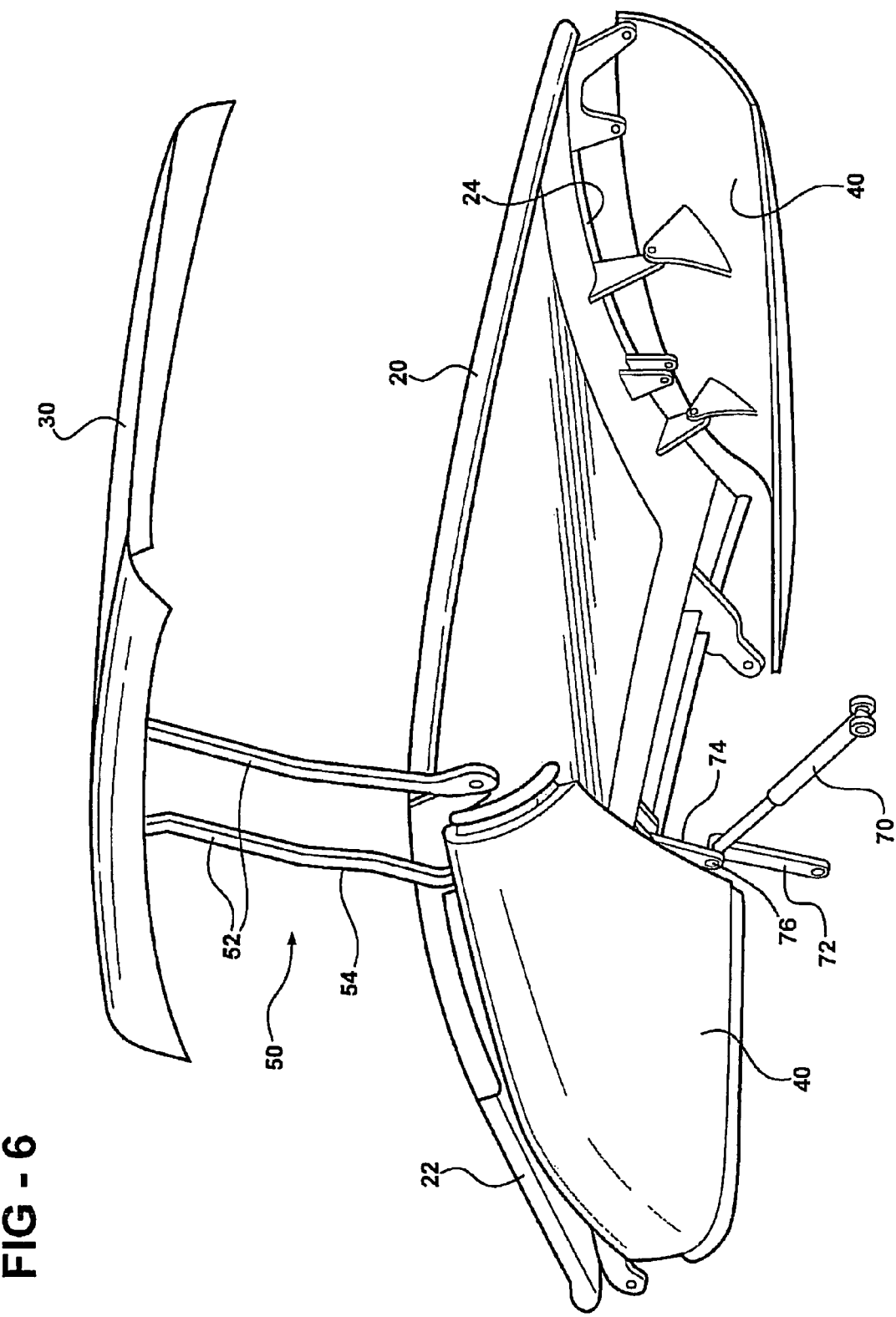
FIG. 6 is a perspective view of the convertible top in the partially open position of FIG. 2.
Figure 7:
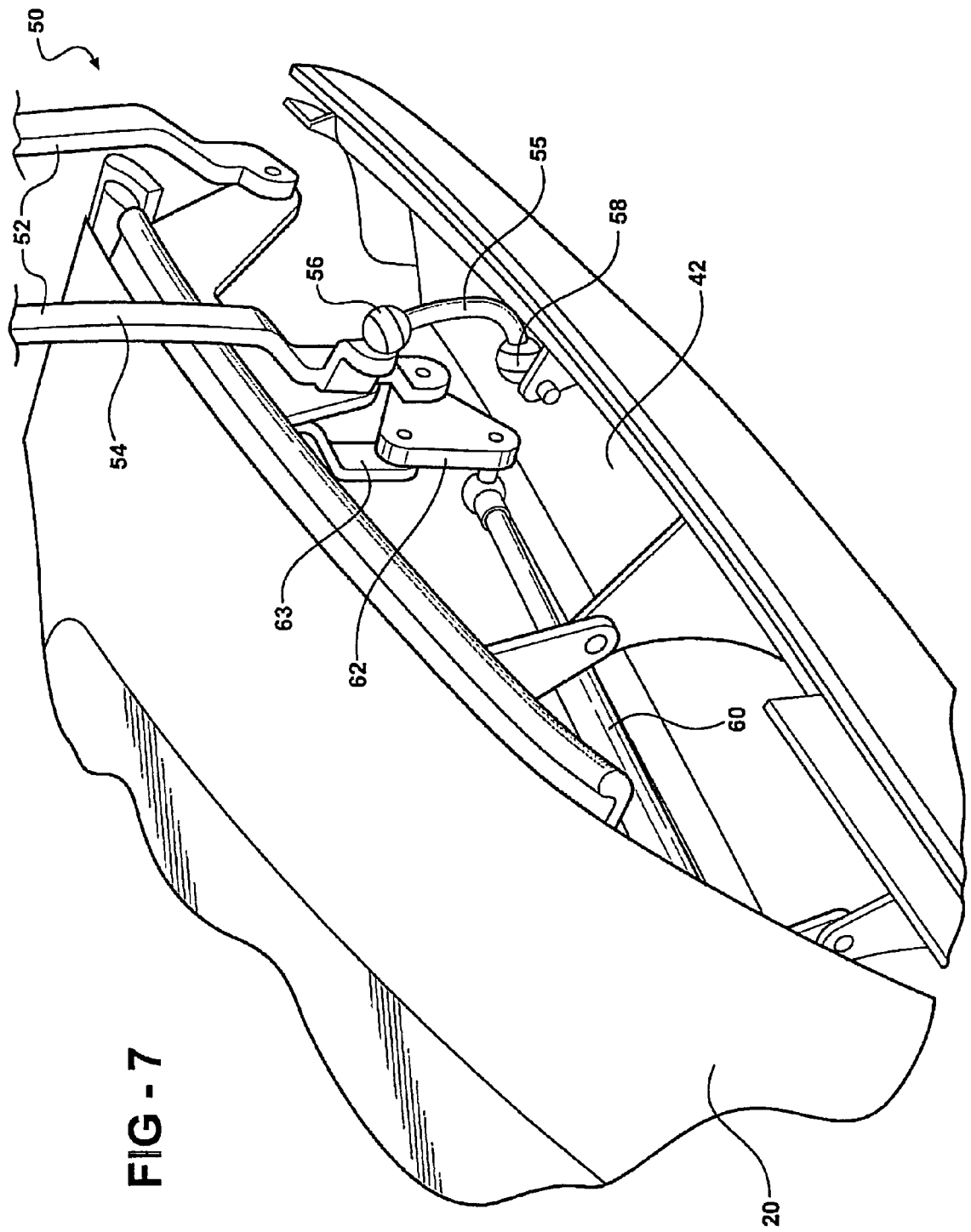
FIG. 7 is an enlarged rear perspective view of a portion of the convertible top in the partially open position of FIG. 2.
Figure 8:
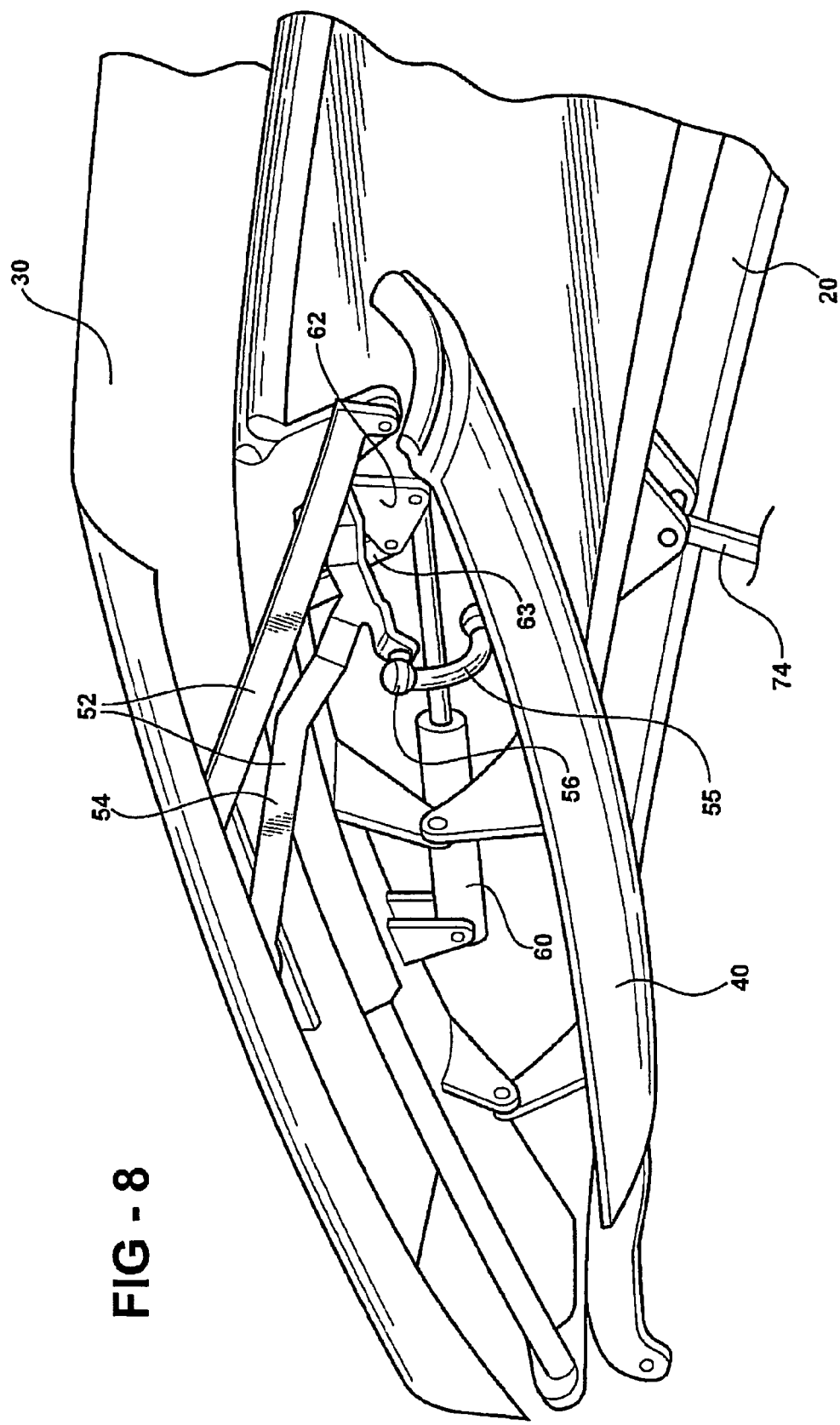
FIG. 8 is an enlarged front perspective view of a portion of the convertible top in the retracted position.
Figure 9:
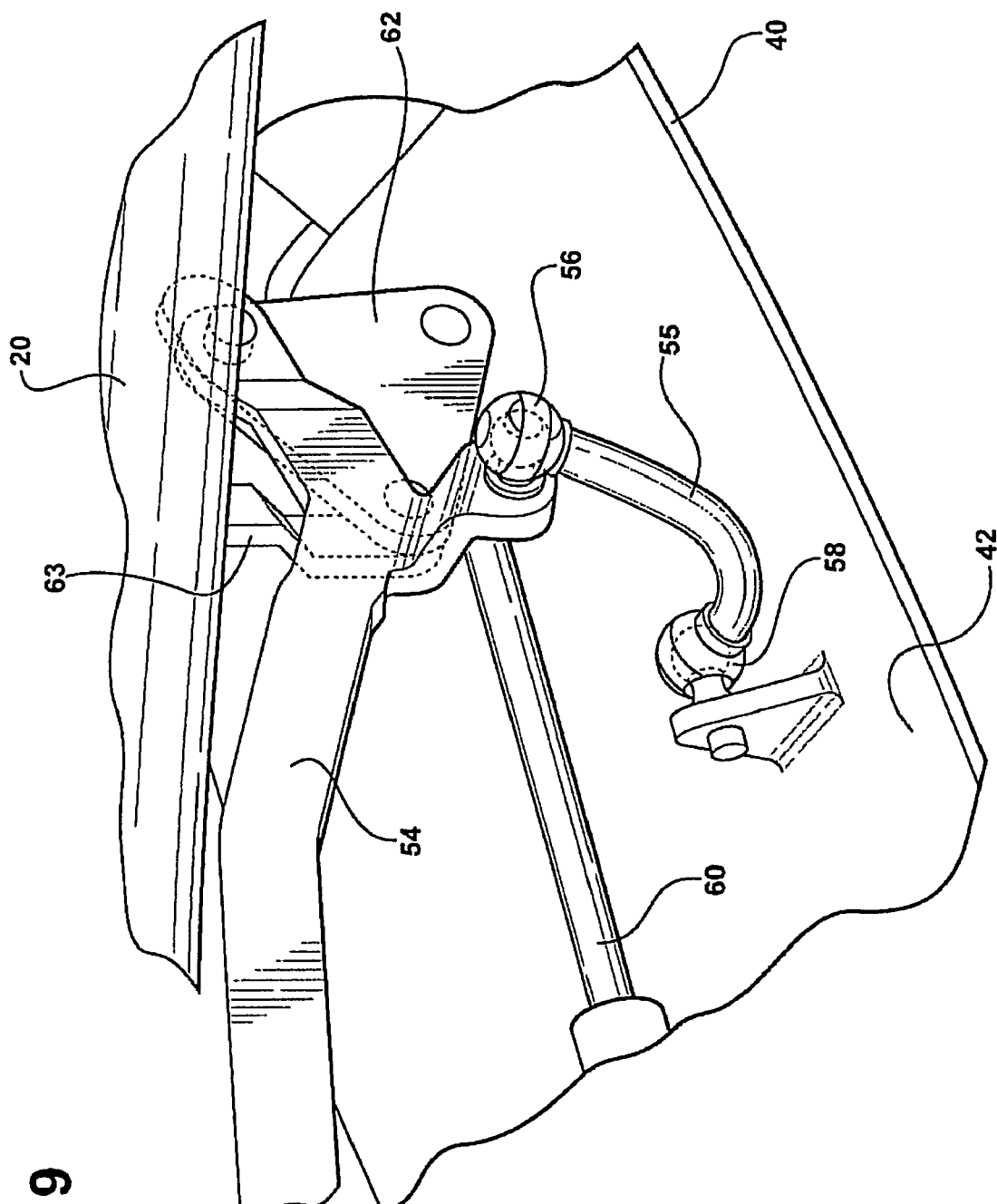
FIG. 9 is an enlarged rear perspective view of a portion of the convertible top in the retracted position.

Referring to FIGS. 4 and 6, a second actuator 70 is drivingly coupled to the rear panel 20 for driving the top assembly 10 between the partially closed position and the closed position. The second actuator 70, as illustrated, is a linear actuator. It should be appreciated that other actuators may be used, such as an electric motor. A first link 72 is pivotally coupled to the body 8 of the motor vehicle and a second link 74 is pivotally coupled to the rear panel 20. The first 72 and second 74 links are pivotally coupled to each other by a rear pivot 76.

The second actuator 70 may be coupled to one of the first 72 and second 74 links or at the rear pivot 76, as shown, for driving the top assembly 10 between the partially closed and closed positions. Further, the first 72 and second 74 links may be movable to an overcenter position to retain the rear panel 20 above the beltline of the motor vehicle.

Referring to FIG. 1, the top assembly 10 may be disposed in a rear seat area 80 of the motor vehicle when the top assembly 10 is in the closed position. In this case, the motor vehicle may include a rear seat having a seat cushion 84 for supporting a seated occupant and a seat back 82 for supporting the back of the seated occupant. The seat back 82 may be movable between a generally upright use position and a generally horizontal folded flat position overlying the seat cushion 84 so as to accommodate the movement of the convertible top 10 between the closed and open positions. The seat back 82 may also be movable by a variety of mechanisms, such as a linkage, slides and/or any other suitable articulating mechanism or combination thereof. In the particular embodiment illustrated in FIG. 1, the seat back 82 is pivotally coupled to the body of the motor vehicle by a four bar linkage 88, 89 to provide the movement between the use and folded flat positions. The front surface 86 of the seat back 82 faces the convertible top 10 when the seat back 82 is in the folded flat position and provides a visually appealing surface in case the top assembly 10 remains in the extended position.

The invention has been described in an illustrative manner. It is, therefore, to be understood that the terminology used is intended to be in the nature of words of description rather than of limitation. Many modifications and variations of the invention are possible in light of the above teachings. For example, the linear actuators in the illustrated embodiment can be replaced by electric motors or other suitable actuators known by those having ordinary skill in the art. Thus, within the scope of the appended claims, the invention may be practiced other than as specifically described.

I claim:

1. A convertible top assembly for a motor vehicle, said convertible top comprising:
   a rear panel;
   a front panel movably coupled to the rear panel and movable relative to the rear panel between an extended position extending between the rear panel and a windshield header of the vehicle and a retracted position stacked with respect to the rear panel;
   a pair of outer side panels movably coupled to the rear panel for movement between a use position extending outwardly from opposite sides of the rear panel and a stowed position disposed inwardly from the use position; and
   an articulating mechanism operatively connecting the outer side panels and the front panel so as to cause movement of the outer side panels between the use position and the stowed position in response to movement of the front panel between the extended position and the retracted position, respectively, the articulating mechanism including a four bar linkage pivotally interconnecting the front panel and the rear panel, the four bar linkage providing movement of the front panel relative to the rear panel between the extended position and the retracted position.

2. The convertible top assembly as set forth in claim 1, wherein the four bar linkage includes a driving link mechanically coupled to one of the outer side panels to cause the movement of the one of the outer side panels between the use and stowed positions in response to the movement of the front panel between the closed and retracted positions, respectively.

3. The convertible top assembly as set forth in claim 2, wherein the articulating mechanism includes a driven link having a first end pivotally coupled to the driving link and an opposite second end pivotally coupled to the one of the outer side panels, each of the first and second ends of the driven link being pivotally coupled to the driving link and the one of the outer side panels, respectively, by a ball joint, the driving link being the rearmost link of the four bar linkage.

4. The convertible top assembly as set forth in claim 2 including:
a linear actuator driving a link of the four bar linkage to cause movement of the front panel between the closed and retracted positions; and
a rocker pivotally coupled to both the rear panel and the driving link of the four bar linkage.

5. The convertible top assembly as set forth in claim 4, wherein the actuator is coupled to the rocker and rotatably drives the rocker to cause corresponding pivotal movement of the front panel relative to the rear panel between the extended and retracted positions.

6. The convertible top assembly as set forth in claim 1, wherein the rear panel is pivotally coupled to a body of the motor vehicle for movement of the top assembly while the front panel is in the retracted position between a partially closed position, wherein the top assembly is disposed above a beltline of the motor vehicle, and a fully closed position.

7. The convertible top assembly as set forth in claim 6 including a second actuator drivingly coupled to the rear panel for driving the top assembly between the partially closed position and the fully closed position.

8. The convertible top assembly as set forth in claim 7 including a first link pivotally coupled to the body of the motor vehicle and a second link pivotally coupled to the rear panel, the first and second links being pivotally coupled to each other, the second actuator being coupled to one of the first and second links for driving the top assembly between the partially closed and fully closed positions.

9. The convertible top assembly as set forth in claim 8, wherein the first and second links are movable to an over-center position to retain the top assembly above the beltline of the motor vehicle.

10. The convertible top assembly as set forth in claim 6, wherein a front edge of the rear panel is disposed adjacent front seats in the vehicle when the top assembly is in the fully closed position.

11. The convertible top assembly as set forth in claim 1, wherein the front panel is substantially rigid.

12. The convertible top assembly as set forth in claim 1, wherein a portion of the articulating mechanism moves through gaps defined between each side panel and the rear panel during movement of the front panel between the extended and retracted positions.

13. The convertible top assembly as set forth in claim 1, wherein the outer side panels and the rear panel have substantially the same front to rear length.

14. The convertible top assembly as set forth in claim 1, wherein the front panel is disposed above the rear panel in the retracted position.

15. The convertible top assembly as set forth in claim 1, wherein the front panel and rear panel each have outer surfaces that remain facing upwardly in both the extended and retracted positions.

16. The convertible top assembly as set forth in claim 1, wherein a front edge of the rear panel is disposed adjacent front seats in the vehicle when the top assembly is in the fully closed position.

17. A motor vehicle comprising:
a convertible top movable between a closed position extending over a passenger compartment in the vehicle and an open position in which a substantial portion of the top is disposed in the passenger compartment in the vehicle; and
a rear seat having a seat cushion for supporting a seated occupant and a seat back for supporting the back of the seated occupant, the seat back being movable between an upright use position and a folded flat position overlying the seat cushion so as to accommodate the movement of the convertible between the closed and open positions;
wherein a front surface of the seat back faces the convertible top when the seat back is in the folded flat position.

18. A convertible top assembly for a motor vehicle, said convertible top comprising:
a rear panel;
a front panel movably coupled to the rear panel and movable relative to the rear panel between an extended position extending between the rear panel and a windshield header of the vehicle and a retracted position stacked with respect to the rear panel;
a pair of outer side panels movably coupled to the rear panel for movement between a use position extending outwardly from opposite sides of the rear panel and a stowed position disposed inwardly from the use position; and
an articulating mechanism operatively connecting the outer side panels and the front panel so as to cause movement of the outer side panels between the use position and the stowed position in response to movement of the front panel between the extended position and the retracted position, respectively;
the rear panel being pivotally coupled to a body of the motor vehicle for movement of the top assembly while the front panel is in the retracted position between a partially closed position, wherein the top assembly is disposed above a beltline of the motor vehicle, and a fully closed position;
a first link pivotally coupled to the body of the motor vehicle and a second link pivotally coupled to the rear panel, the first and second links being pivotally coupled to each other; and
a second actuator coupled to one of the first and second links for driving the top assembly between the partially closed and fully closed positions.

19. The convertible top assembly as set forth in claim 18, wherein the first and second links are movable to an over-center position to retain the top assembly above the beltline of the motor vehicle.

20. A convertible top assembly for a motor vehicle, said convertible top comprising:
a rear panel;
a front panel movably coupled to the rear panel and movable relative to the rear panel between an extended position extending between the rear panel and a windshield header of the vehicle and a retracted position stacked with respect to the rear panel;
a pair of outer side panels movably coupled to the rear panel for movement between a use position extending outwardly from opposite sides of the rear panel and a stowed position disposed inwardly from the use position;

an articulating mechanism operatively connecting the outer side panels and the front panel so as to cause movement of the outer side panels between the use position and the stowed position in response to movement of the front panel between the extended position and the retracted position, respectively;

wherein the rear panel is pivotally coupled to a body of the motor vehicle for movement of the top assembly while the front panel is in the retracted position between a partially closed position, wherein the top assembly is disposed above a beltline of the motor vehicle, and a fully closed position; and a front edge of the rear panel being disposed adjacent front seats in the vehicle when the top assembly is in the fully closed position.

21. A convertible top assembly for a motor vehicle, said convertible top comprising:

a rear panel;

a front panel movably coupled to the rear panel and movable relative to the rear panel between an extended position extending between the rear panel and a windshield header of the vehicle and a retracted position stacked with respect to the rear panel;

a pair of outer side panels movably coupled to the rear panel for movement between a use position extending outwardly from opposite sides of the rear panel and a stowed position disposed inwardly from the use position; and an articulating mechanism operatively connecting the outer side panels and the front panel so as to cause movement of the outer side panels between the use position and the stowed position in response to movement of the front panel between the extended position and the retracted position, respectively, a portion of the articulating mechanism moving through gaps defined between each side panel and the rear panel during movement of the front panel between the extended and retracted positions.

22. The convertible top assembly as set forth in claim 21, wherein a front edge of the rear panel is disposed adjacent front seats in the vehicle when the top assembly is in the fully closed position.

23. The convertible top assembly as set forth in claim 21, wherein the front panel is substantially rigid.

24. The convertible top assembly as set forth in claim 21, wherein the outer side panels and the rear panel have substantially the same front to rear length.

25. The convertible top assembly as set forth in claim 21, wherein the front panel is disposed above the rear panel in the retracted position.

26. The convertible top assembly as set forth in claim 21, wherein the front panel and rear panel each have outer surfaces that remain facing upwardly in both the extended and retracted positions.

27. A convertible top assembly for a motor vehicle, said convertible top comprising:

a rear panel;

a front panel movably coupled to the rear panel and movable relative to the rear panel between an extended position extending between the rear panel and a windshield header of the vehicle and a retracted position stacked with respect to the rear panel;

a pair of outer side panels movably coupled to the rear panel for movement between a use position extending outwardly from opposite sides of the rear panel and a stowed position disposed inwardly from the use position; and an articulating mechanism operatively connecting the outer side panels and the front panel so as to cause movement of the outer side panels between the use position and the stowed position in response to movement of the front panel between the extended position and the retracted position, respectively;

the front panel and rear panel each having outer surfaces that remain facing upwardly in both the extended and retracted positions.

28. The convertible top assembly as set forth in claim 27, wherein a front edge of the rear panel is disposed adjacent front seats in the vehicle when the top assembly is in the fully closed position.

29. The convertible top assembly as set forth in claim 27, wherein the front panel is substantially rigid.

30. The convertible top assembly as set forth in claim 27, wherein the outer side panels and the rear panel have substantially the same front to rear length.

31. The convertible top assembly as set forth in claim 27, wherein the front panel is disposed above the rear panel in the retracted position.

32. A convertible top assembly for a motor vehicle, said convertible top comprising:

a rear panel;

a front panel movably coupled to the rear panel and movable relative to the rear panel between an extended position extending between the rear panel and a windshield header of the vehicle and a retracted position stacked with respect to the rear panel;

a pair of outer side panels movably coupled to the rear panel for movement between a use position extending outwardly from opposite sides of the rear panel and a stowed position disposed inwardly from the use position; and an articulating mechanism operatively connecting the outer side panels and the front panel so as to cause movement of the outer side panels between the use position and the stowed position in response to movement of the front panel between the extended position and the retracted position, respectively;

a front edge of the rear panel being disposed adjacent front seats in the vehicle when the top assembly is in the fully closed position.

* * * * *